United States Patent [19]

Martuch

[11] 4,194,936
[45] Mar. 25, 1980

[54] METHOD OF MAKING A FISHING LINE INDICATOR

[75] Inventor: Leon L. Martuch, Orlando, Fla.

[73] Assignee: JFL Development Company, Orlando, Fla.

[21] Appl. No.: 935,254

[22] Filed: Aug. 21, 1978

[51] Int. Cl.² .................. B32B 33/00; B32B 27/32; C09K 11/00
[52] U.S. Cl. .................. 156/67; 43/17.5; 43/44.89; 156/166; 156/217; 156/226; 156/250; 156/267
[58] Field of Search .............. 43/17.5, 44.87, 44.89, 43/44.91, 44.98; 156/67, 211, 216, 217, 250, 166, 78, 226, 267

[56] References Cited

U.S. PATENT DOCUMENTS

| | | |
|---|---|---|
| 2,351,558 | 6/1944 | Sykora .................. 43/44.87 |
| 2,367,189 | 1/1945 | Avery .................. 156/166 |
| 2,543,879 | 3/1951 | Stuckey .................. 156/67 X |
| 3,107,451 | 10/1963 | Sitzler et al. .................. 43/44.87 |
| 4,083,740 | 4/1978 | Hamanaka .................. 156/166 |

Primary Examiner—William A. Powell
Assistant Examiner—Thomas Bokan
Attorney, Agent, or Firm—Duckworth, Hobby, Allen & Pettis

[57] ABSTRACT

A method of making a fishing line indicator for nymph fishing uses a thin sheet of flat closed cell polyethylene foam having a plurality of hemispheres formed thereon to which is applied a rubber based adhesive to one flat side thereof and then covering the adhesive with a protective covering. A fluorescent coat is applied to the other side of the sheet having hemispheres thereon and a plurality of fishing line indicators are cut from the sheet, each including two hemispheres.

8 Claims, 6 Drawing Figures

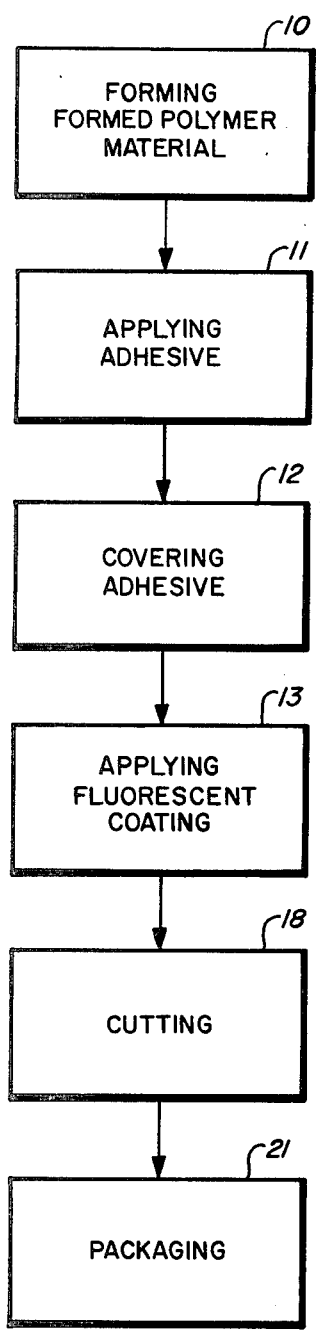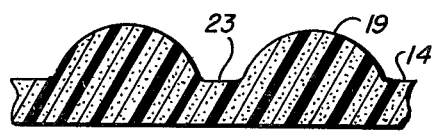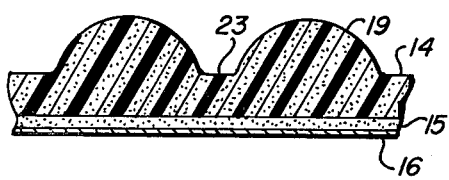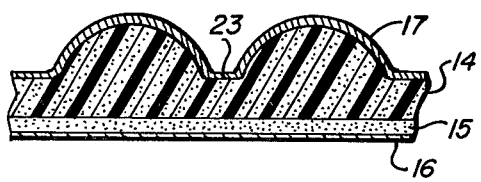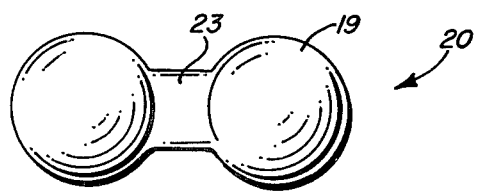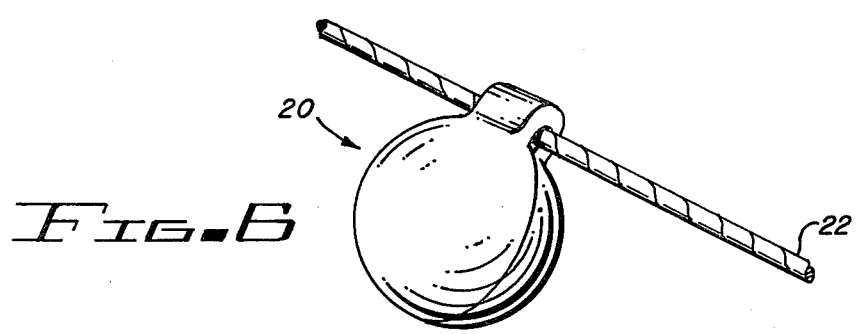

METHOD OF MAKING A FISHING LINE INDICATOR

BACKGROUND OF THE INVENTION

The present invention relates to a method of making a fishing line indicator for use in nymph fishing to add buoyancy to the fishing line and a visible indicator on top of the water.

DESCRIPTION OF THE PRIOR ART

The prior art contains many references including entire books on fly fishing, and these generally include a description of nymph fishing for trout. Typically, the fly fishing line is formed of materials to provide buoyancy so that some or all of the line will float on the surface of the water during fishing. One effective method of taking trout is the use of artificial nymphs since a great portion of the food used by stream trout is represented by the underwater nymph stage of aquatic insects. An angler skilled in the effective presentation of artificial nymphs will consistently take more fish than one who relies only on the dry fly which represents the winged form of aquatic insects. Fishing with artificial nymphs requires a special technique of casting upstream and allowing the artificial nymph to tumble in the natural manner on or near the bottom of the stream. The angler is fishing with a slack line in order to avoid impeding the natural drift of the artificial nymph. Trout will pick up and spit out an artificial nymph instantly so that effective nymph fishing requires the angler to be able to detect the precise moment the nymph is picked up and before the trout has a chance to spit it out. In the past, the fisherman detected the trout by watching the tip of the line at the point where it attaches to the leader and sets the hook at the perceptible moment of the line tip. One of the problems with fly fishing lines has been a tendency of a line to settle into the water, or even sink as it picks up a coating of surface debris from the water. In addition, the line must be closely followed by the fisherman to enable him to detect the less perceptible strikes in nymph fishing. That is, a good fisherman will notice even the slightest hesitation in the tip of his free floating line, but must have quick reflexes to strike in time to catch the trout before he spits out the nymph.

To enable the fisherman to see the line better, it has been suggested in U.S. Pat. No. 4,048,744 to use a fishing line having a section near one end having a greater buoyancy than the remainder of the line and having more visible material thereon. It has also been suggested in writings to use a dry fly as a bobber to pinpoint the end of the line and to help see the line. The dry fly bobber, however, is somewhat more clumsy to cast and difficult to keep floating especially in a tumbling current. It has also been suggested to color a piece of the line with a more visible color to allow the fisherman to see the line as it floats along. The present invention is directed towards a method of making an inexpensive, disposable fishing line indicator which can be quickly attached to the fly line or leader to add buoyancy to the point of attachment and to provide a bright fluorescent color which can be easily seen by the angler, thus avoiding the use of dry fly bobbers and special lines, while providing a more effective sight for the fisherman.

SUMMARY OF THE INVENTION

The present invention teaches a method of making a fishing line indicator for attaching to fishing lines with an adhesive to add buoyancy and greater visibility to a point on the fishing line. The method includes the step of applying an adhesive to a flat side of a thin sheet of closed cell polyethylene foam having small hemispheres formed on the other side and covering the adhesive with a material such as a wax paper, then applying a fluorescent coating to the other side of the sheet of foam polymer having the hemispheres thereon. A plurality of fishing line indicators are cut to a predetermined shape from the sheet of foamed polymer and packaged.

BRIEF DESCRIPTION OF THE DRAWINGS

Other objects, features and advantages of the present invention will be apparent from the written description and the drawings, in which:

FIG. 1 is a flow diagram of the method of the present invention;

FIG. 2 is a sectional view of a thin sheet of foam polymer material;

FIG. 3 is a sectional view of the thin sheet of FIG. 2, having an adhesive covering applied thereto;

FIG. 4 is a fragmentary section of the thin sheet of FIG. 3 having a fluorescent coating applied thereto;

FIG. 5 is a top elevation of a fishing line indicator made in accordance with the method of FIG. 1; and FIG. 6 is a side elevation of a segment of fishing line having a fishing line indicator attached thereto.

DESCRIPTION OF THE PREFERRED EMBODIMENT

Referring to the drawings, and especially to FIG. 1, a method in accordance with the present invention starts with forming a thin sheet of closed cell polyethylene foam with hemispheres on one side at step 10, which material has the appropriate buoyancy and is water resistant. The thickness of the foam sheet might typically be one-sixteenth of an inch, exclusive of hemispheres. The sheet of foam polymer has a rubber based adhesive applied at 11, coating one side of the foam polymer. The adhesive coating is then covered at 12 with a wax coated paper, or the like, which has only limited adherence to the adhesive, yet protects the adhesive from contamination. A sectional fragment of the foam polymer sheet 14 is seen in FIGS. 2 and 3 having hemispheres 19 spaced by spacing 23 and the adhesive 15 applied and a protective cover 16 covering the adhesive. The opposite flat side of the foam polymer is then coated with a fluorescent coating, such as a fluorescent paint or fluorescent coated paper or plastic film and may be adhesively attached to the foam polymer as shown in FIG. 4. The fluorescent coating 17 is attached to the foam sheet 14, but the foamed sheet may have a fluorescent dye or pigment added to the foam when the foam is formed. Once the fluorescent coating has been applied (or added to the resins) and cured, the step of cutting 18, may be performed with die cuts of a plurality of cuts at one time to a predetermined shape, such as the fly line indicator 20 of FIG. 5. The die cutting can take different shapes, but typically would be limited to a small volume of material with two hemispheres to provide the appropriate amount of buoyancy and visibility for the fisherman. The cut fly line indicators are then packaged at 21 in conventional packaging machinery and are applied as shown in FIG. 6 to a fly line 22 having the line indicator 20 wrapped therearound after the adhesive cover 16 is removed to open the face of the adhesive for attaching it to the line, or if desired, around the line and face-to-face to form a sphere from two hemispheres. Inasmuch as the cost of a package of fly line indicators is relatively inexpensive, they can be classed as a disposable item which can be removed from the line and another one placed on if desired by the angler. It will, of course, be clear that other materials than mentioned herein can be used in the present method, such as a thin foam polymer of closed cell polymer material without the hemisphere thereon or with different shapes which have sufficient buoyancy and water resistance.

Closed cell polyethylene foam is widely available and will not become saturated like an open pore polymer foam material. Similarly, the adhesive must be a flexible water resistant adhesive and standard rubber adhesives are preferred, while the covering material may be a wax coated paper.

In use, the angler would simply pull one of the fly line indicators 20 from his fishing box or bag, peel off the adhesive covering 16 and wrap the indicator around the line 22, as shown in FIG. 6. Accordingly, the present invention is not to be construed as limited to the forms illustrated, which are to be considered illustrative rather than restrictive.

I claim:

1. A method of making fishing line indicators capable of being used in artificial nymph fishing comprising the steps of:

forming a sheet of foamed polymer material with a plurality of predetermined shapes on one side thereof;

applying an adhesive to the other side of said foamed polymer material;

applying a protective covering over said adhesive on the other side of said foamed polymer material;

applying a fluorescent material to the one side of said foamed polymer material having predetermined shapes thereon; and cutting said sheet of foam polymer material having said adhesive and coating thereon to form a plurality of predetermined shapes capable of use as fishing line indicators in artificial nymph fishing.

2. The method in accordance with claim 1, in which the step of applying an adhesive to the other side of said foamed polymer material includes applying an adhesive to one flat side of closed cell polyethylene foam material.

3. The method in accordance with claim 2, in which the step of applying an adhesive includes the applying of a rubber based adhesive to said closed cell polyethylene foam.

4. The method in accordance with claim 3, in which the step of applying a covering over said adhesive includes applying a wax coated paper covering over said adhesive.

5. The method in accordance with claim 4, in which the step of cutting said sheet of foam polymer material includes die cutting a plurality of fishing line indicators of predetermined shape.

6. The method in accordance with claim 1, in which the step of cutting said sheet of foam polymer material includes die cutting a plurality of fishing line indicators each including at least two hemispheres on one side of said foam polymer sheet.

7. The method in accordance with claim 6 including the step of forming a sheet of foamed polymer material with a fluorescent material therein.

8. A fishing line indicator made from a closed cell polyethylene foam coated with a fluorescent material on one side and with an adhesive on the other side and having the adhesive covered with a wax covered sheet and made in accordance with the process of claim 1.

* * * * *